United States Patent [19]

Sasaki

[11] Patent Number: 4,460,148
[45] Date of Patent: Jul. 17, 1984

[54] BALANCER

[76] Inventor: Tadajiro Sasaki, 12-27 Tsumuri 3-Chome, Tsumari-ku, Osaka 538, Japan

[21] Appl. No.: 253,514
[22] PCT Filed: Jun. 17, 1980
[86] PCT No.: PCT/JP80/00134
 § 371 Date: Apr. 9, 1981
 § 102(e) Date: Apr. 9, 1981
[87] PCT Pub. No.: WO81/00744
 PCT Pub. Date: Mar. 19, 1981

[30] Foreign Application Priority Data

Sep. 11, 1979 [JP] Japan .................. 54-117039

[51] Int. Cl.³ ............................ F16M 13/00
[52] U.S. Cl. .................................. 248/585
[58] Field of Search ............... 248/123.1, 280.1, 281.1, 248/323, 572, 575, 579, 585, 586, 587

[56] References Cited

U.S. PATENT DOCUMENTS

| | | | |
|---|---|---|---|
| 2,299,251 | 10/1942 | Perbal | 248/575 X |
| 2,675,985 | 4/1954 | Boiteux | 248/575 |
| 2,833,504 | 5/1958 | Sacksteder | 248/585 |
| 3,285,562 | 11/1966 | Langer | 248/575 X |
| 3,543,019 | 11/1970 | Jacobsen | 248/586 X |
| 4,003,536 | 1/1977 | Sekerich | 248/585 |
| 4,166,602 | 9/1979 | Nilsen | 248/123.1 |
| 4,266,747 | 5/1981 | Souder | 248/586 X |
| 4,296,906 | 10/1981 | Matthijsse | 248/280.1 |
| 4,344,595 | 8/1982 | Heller | 248/280.1 X |

FOREIGN PATENT DOCUMENTS

| | | |
|---|---|---|
| 805687 | 5/1951 | Fed. Rep. of Germany ... 248/280.1 |
| 34-6833 | 8/1959 | Japan . |
| 52-41348 | 3/1977 | Japan . |

Primary Examiner—William H. Schultz
Attorney, Agent, or Firm—Burns, Doane, Swecker & Mathis

[57] ABSTRACT

This invention relates to a balancer (8) for movably supporting an operating machine above an operating table. The balancer (8) comprises a link mechanism, a bracket (15) supported at the front end of the link mechanism for holding the operating machine, and a spring for loading the front end of the link mechanism or the bracket (15) with balancing force by means of an arm (23) and a pulling member; and a position of the action point on the arm (23) of the elastic force of the spring (48) is shifted by turning a handle (40).

3 Claims, 4 Drawing Figures

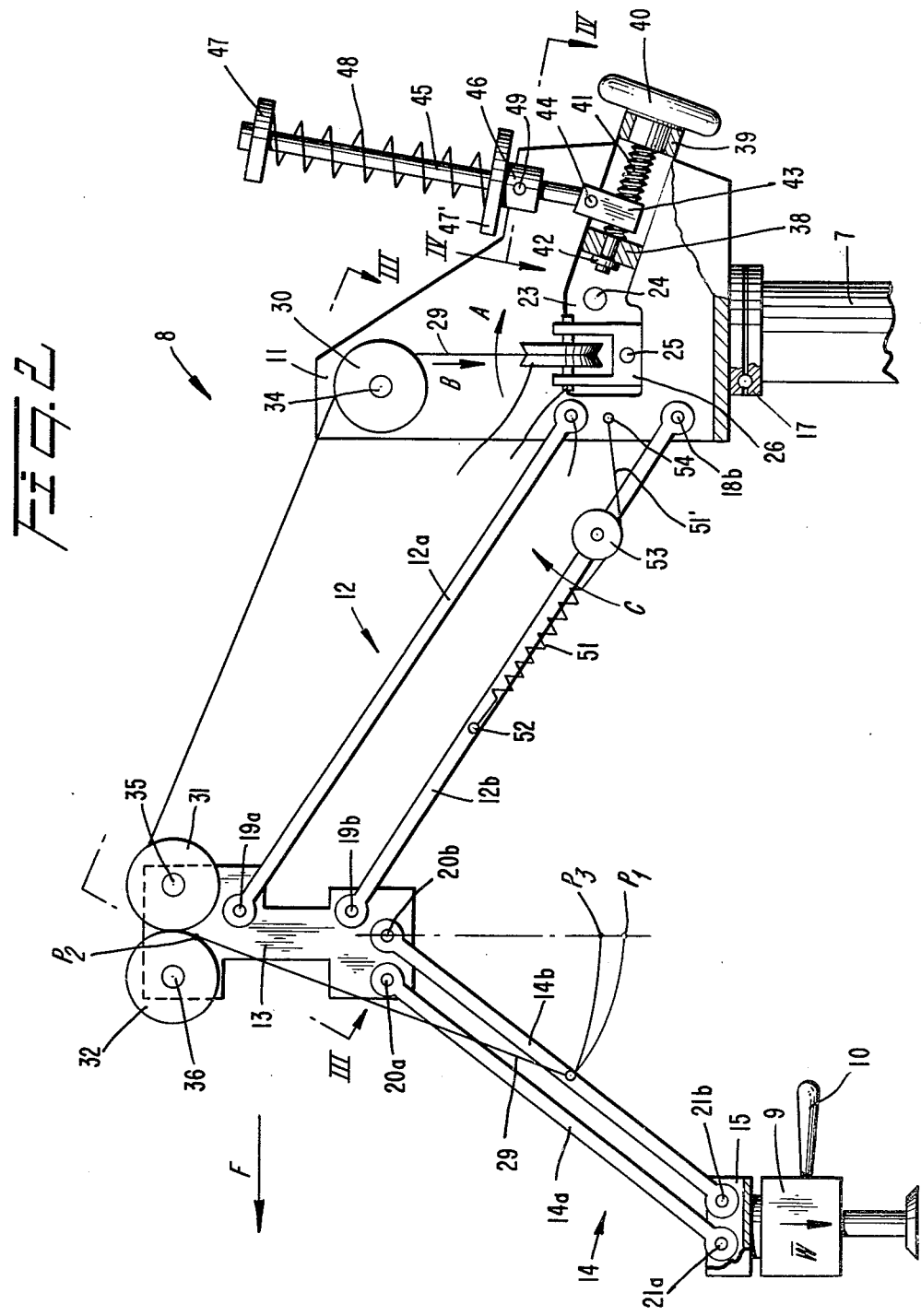

BALANCER

FIELD OF THE INVENTION

This invention relates to a balancer for movably supporting an operating machine above a work table, especially a balancer in which several kinds of operating machines having different weights can alternatively be mounted without exchanging a spring assembled in the balancer.

BACKGROUND OF THE INVENTION

Conventionally, in Japanese patent application No. 1975-117039 by a third party, such a balancer has already been proposed which comprises a horizontal supporting shaft arranged on a column, a beam, one end of which is connected to the beam, a hook arranged at the other end of the beam, an expansible spring member located higher than the supporting shaft and extending between the intermediate portion of the beam and the top portion of the column, so that the position of the action point of the spring member is adjustable on the beam. However, a strong force moment is loaded on the beam itself in such balancer; therefore the beam should be constructed in especially high strength, which causes an increase in cost of the balancer.

DISCLOSURE OF THE INVENTION

This invention is performed to solve the conventional problem stated above by loading the strong elastic force of a spring onto the end portion of a beam by means of a pulling member such as a wire, chain, or the like without loading the force of the spring directly onto the beam. The primary object of the present invention is to provide a balancer comprising a first bracket rotatable around a vertical axis; a first parallel link unit inclinable upwardly and downwardly in a vertical plane containing the rotating axis of the first bracket and located in front of the bracket; a second parallel link unit supported by a second bracket at the front end of the first parallel link units and swingable in the vertical plane located under the second bracket; a third bracket mounted at the lower end of the second parallel link unit for holding an operating machine; an arm supported by the first bracket by means of a horizontal shaft extending perpendicularly to the vertical plane; a pulling member extending forwardly from a rear end thereof connected to the arm, passing over the faced peripheries of two adjacent front and rear guide wheel means, extending downwardly from the guide wheel means, and being connected to the portion of the second parallel link unit spaced from and located under the second bracket; a bolt rotatably supported by the arm, said bolt extending lengthwisely with respect to the arm, and being provided with a handle; a shiftable nut on the bolt; and a spring loading the shiftable nut with elastic force for pulling the pulling member; said nut is shifted by turning the handle, thereby the balancer is balanced.

Other objects and advantages of this invention will be apparent from the following description of a preferred embodiment thereof, reference being had to the accompanying drawings.

BRIEF DESCRIPTION OF THE FIGURES OF THE DRAWING

FIG. 2 is a fragmentary side view of the balancer shown in FIG. 1.

PREFERRED EMBODIMENT OF THE INVENTION

Figure 1:
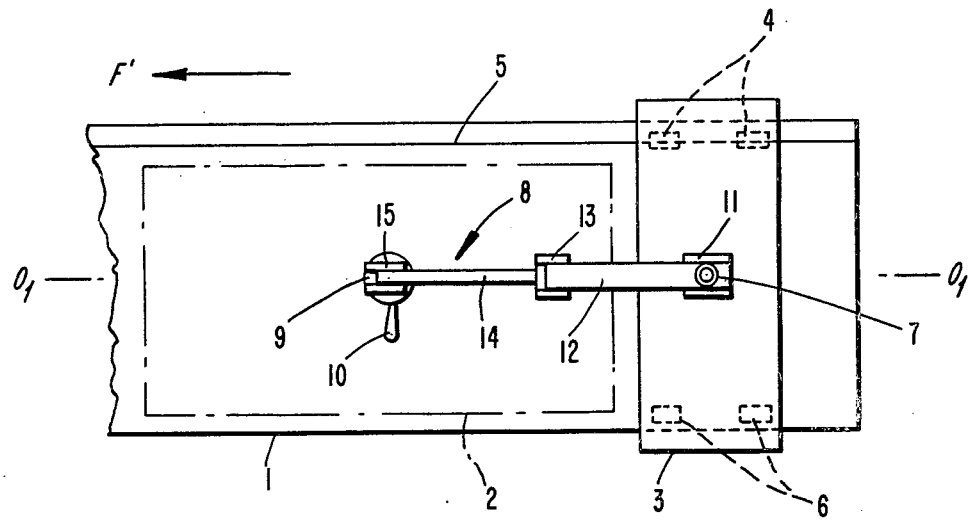
FIG. 1 is a schematic view in top plane showing a balancer on an operating table according to this invention.

Referring to FIG. 1, an arrow F' indicates forward direction, and cloth 2 is unrolled by an unrolling machine (not shown) from cloth roll and stacked over a work table 1. At 3 is indicated a carriage. Two wheels 4 mounted on right side of the bottom of the carriage 3 mesh with a rail 5 along a side of the table 1, and two left rubber wheels 6 merely ride on the table 1 without meshing. The carriage 3 is provided with a vertical column 7 at the center thereof, and a balancer 8 is mounted at the top of the column 7. At the end of the balancer 8, a cutting machine 9 (operating machine) is supported which is balanced in its vertical position by the balancer 8. An operator can cut the cloth 2 by moving the cutting machine 9 along the surface of the table 1 by a handle 10. The balancer 8 comprises a first bracket 11 being rotatable on the column 7 around a vertical axis, a first parallel link unit 12 being inclinable upwardly and downwardly in vertical plane $O_1$—$O_1$ containing the centerline of the column 7, a second bracket 13 at the end of the first parallel link unit 12, a second parallel link unit 14 being swingable in the vertical plane $O_1$—$O_1$ under the second bracket 13, and a third bracket 15 at the end of the second parallel link unit 14 for holding the cutting machine 9. The detailed construction of the balancer 8 is shown in FIG. 2.

Referring to FIG. 2, the first bracket 11 is provided with two parallelly spaced vertical plates, and the lower portion thereof is rotatably supported at the top of the column 7 by means of thrust bearing 17. At 12a, 12b are indicated links forming upper and lower sides of the first parallel link unit 12, rear ends (right ends in FIG. 2) thereof are connected to the front edge of the first bracket 11 by means of pins 18a, 18b, and front ends thereof are connected to the second bracket 13 by means of pins 19a, 19b. Both links 12a, 12b have same length, and the vertical distance between the pins 18a, 18b is same as the vertical distance between the pins 19a, 19b. The first parallel link unit 12 is formed with upper and lower links 12a, 12b, and first and second brackets 11, 13. At 14a, 14b are indicated links forming front and rear sides of the second parallel link unit 14, upper ends thereof are respectively connected to front and rear pins 20a, 20b at the lower end of the second bracket 13, and lower ends thereof are respectively connected to front and rear pins 21a, 21b. The second parallel link unit 4 is formed with these links 14a, 14b and brackets 13, 15.

Figure 3:
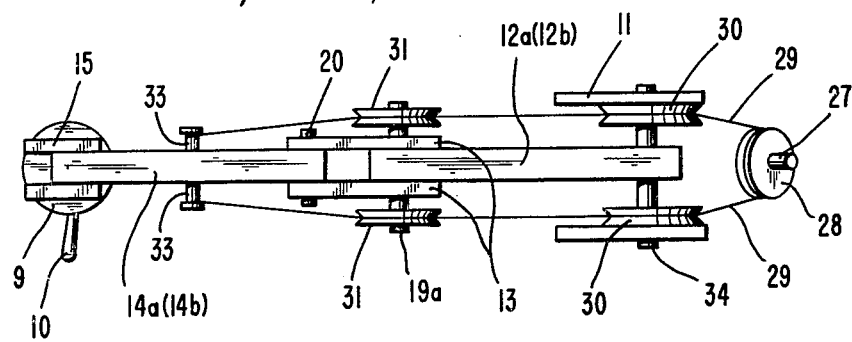
FIG. 3 and FIG. 4 are fragmentary section views taken along lines III—III and IV—IV respectively in FIG. 2.

At 23 is indicated a dog-legged arm, which is provided with two plates extending parallel to the first bracket 11. The arm 23 is rotatably supported by the first bracket 11 by means of a pin 24 (horizontal shaft). A holder 26 having a U-shaped section is rotatably supported at the front end of the arm 23 by means of a pin 25. A pulley 28 having a V-shaped groove is supported by the holder 26 by means of a pin 27. At 29 is indicated a wire retained around the lower periphery of the pulley 28. As shown in FIG. 3, two portions of the wire 29 extend substantially parallel with each other from the pulley 28, pass through a pair of pulleys 30, 30 (guide wheel means) and another pair of pulleys 31, 31 (guide wheel means), extend downwardly with the links 14a, 14b therebetween, and ends thereof are connected to pins 33, 33 on the side faces of the link 14b. The pulleys 30, 30 are rotatably supported at the top of the first bracket 11 by means of a pin 34. The pulleys 31, 31 are rotatably supported at the top of the second bracket 13 by means of a pin 35. Pulleys 32, 32 (guide wheel means) are so arranged in front of the pulleys 31, 31 that the V-shaped grooves in both pairs of pulleys 31, 31, and 32, 32 face each other. Each portion of the wire 29 is meshed with the faced V-shaped grooves of the adjacent pulleys 31, 32 and extends downwardly between the pulleys 31, 32. At 36 is indicated a pin supporting the pulleys 32, 32.

Figure 4:
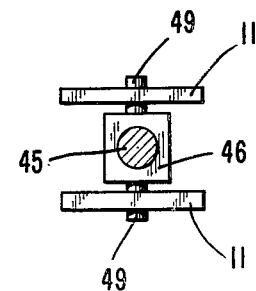

At 38, 39 are indicated bearings integrally formed with the arm 23. A shaft portion of a bolt 41 having a handle 40 is fitted into the bearings 38, 39 and fixed by a snap ring 42. At 43 is indicated a shiftable nut screwed on the bolt 41, and to the nut 43 is connected a lower end of a rod 45 by means of a pin 44. The rod 45 extends upwardly, passing through an aperture of a socket 46. A strongly compressed spring 48 is arranged between a spring seat 47 fixed at the top of the rod 45 and a spring seat 47' on the socket 46. As shown in FIG. 4, the socket 46 has pins 49, 49 at both sides thereof. The pins 49, 49 are rotatably supported in the aperture of the bracket 11, whereby the rod 45 is pivoted around the pins 49 as a fulcrum when the position of the nut 43 (the position of the action point) is shifted on the bolt 41 by manually turning the handle 40. The elastic force of the spring 48 acts upwardly onto the rod 45 by means of the spring seat 47, therefore the arm 23 is loaded with the moment in the direction contrary to the arrow A around the pin 24 by means of the shiftable nut 43, the bolt 41 and the bearings 38, 39, and the arm 23 pulls the wire 29 in the direction of arrow B by means of the pin 25, the holder 26, the pulley 28.

At 51 is indicated an auxiliary spring. The front end thereof is connected to the link 12b by means of a pin 52, and the rear end thereof is connected to a wire 51'. The wire 51' is retained around the lower periphery of a pulley 53 on the link 12b and connected to a pin 54 on the first bracket 11. The wire 51' loads the link 12b with a moment in the direction shown by arrow C around the pin 18b. This moment is so set that it balances with the total weight of the link members (the first and second link units 12, 14, etc.) extending forwardly from the first bracket 11 when the cutting machine 9 is not mounted, thereby preventing the first parallel link unit 12 from inclining downwardly. When the cutting machine is mounted on the third bracket 15, the machine 9 is balanced by turning the handle 40 and thereby increasing or decreasing the tensile force of the wire 29 according to the weight of the machine 9. When moving the cutting machine 9 backwardly (opposite direction to the arrow F) from the position shown in FIG. 2, the pins 33, 33 move around the pin 20b toward point $P_1$, however the wire 29 which is connected to the pins 33, 33 and supported by the pulleys 32, 32, inclines around the point $P_2$ connected with the pulleys 32, 32 as a fulcrum (the position of the point $P_2$ moves), and the pins 33, 33 move toward a point $P_3$ along an arc of a circle around the point $P_2$ as a center. Therefore the pins 33, 33 move by the elastic force of the spring 48 to the point $P_3$ located above the point $P_1$, and the cutting machine 9 moves substantially horizontally. This operation can be similarly obtained when shifting the vertical balance position of the cutting machine 9.

According to this invention, as stated above, the elastic force of the strong spring 48 acts on the link 14b or the third bracket 15 (the portion of the link unit 14 distant from the second bracket 13) located at the front end of the balancer 8 by means of the arm 23 and the wire 29, and bending moment does not substantially act on the upper and lower links 12a, 12b of the first parallel link unit 12 as well as the upper link 14a of the second parallel link unit 14, therefore it is not necessary to give especially high strength to the members, which make it possible to reduce the weight of the balancer 8. Furthermore, the heavy (e.g., 20 kg) cutting machine 9 can be held steady. As the nut 43, on which the elastic force of the spring 48 acts, is shiftable along the bold 41, when the machine 9 is exchanged for another one having different weight, the other machine 9 can easily be balanced by manually turning the handle 40, therefore various kinds of the machines 9 can be used. As the wire 29 passes downwardly through the faced V-shaped grooves of the adjacent pairs of the pulleys 31, 31 and 32, 32, both positions of the point $P_2$ are symmetrical, namely, one position of the point $P_2$ when the second parallel link unit 14 inclined forwardly from the second bracket 13 as shown in FIG. 2 and other position of the point $P_2$ when it inclined rearwardly, are symmetrical in front and rear positions with each other, therefore the cutting machine 9 is substantially horizontally moved independently of the position of the machine 9; moreover, there is no danger that the wire 29 either slackens or slips out the pulleys.

In the embodiment described above, as the wire 29 is divided into two portions by the pulley 28, and the two portions of the wire 29 are connected to the pins 33, 33 on both sides of the second link unit 14, there is no danger that the first and second link units 12, 14 twist, and therefore the posture of the machine 9 can always be more steady. Of course, it is possible to eliminate the pulley 28, and connect a rear end of a wire to the front end of the arm 23, said wire being retained over a pulley of the first bracket 11 and over a pulley on the second bracket 13, passed above the center of the first and second parallel link units 12, 14, the front end of the wire being connected to the intermediate portion of the link 14a. In such case, a chain is preferably employed instead of the wire. The balancer 8 shown in FIG. 8 may be mounted on a column arranged on a carriage having wheels or casters and set on the floor of the operating room.

I claim:

1. A balancer comprising a first bracket (11) being rotatable around a vertical axis; a first parallel link unit (12) being inclinable upwardly and downwardly in a vertical plane ($O_1$—$O_1$) containing the rotating axis of the first bracket (11) and located in front of the bracket (11); a second parallel link unit (14) being supported by a second bracket (13) at the front end of the first parallel link units (12) and being swingable in the vertical plane ($O_1$—$O_1$) located under the second bracket (13); a third bracket (15) mounted at the lower end of the second parallel link unit (14) for holding an operating machine; an arm (23) supported by the first bracket (11) by means of a horizontal shaft extending perpendicularly to the vertical plane ($O_1$—$O_1$); a pulling member extending forwardly from a rear end thereof connected to the arm (23), passing over the faced peripheries of two adjacent front and rear guide wheel means, extending downwardly from the guide wheel means, and being connected to the portion of the second parallel link unit (14) distant from and located under the second bracket (13); a bolt (41) rotatably supported by the arm (23), said bolt (41) extending lengthwisely with respect to the arm (23), and being provided with a handle (40); a shiftable nut (43) on the bolt (41); and a spring (48) loading the shiftable nut (43) with the elastic force for pulling the pulling member; said nut (43) is shifted by turning the handle (40), thereby the balancer (8) is balanced.

2. A balancer (8) as claimed in claim 1, wherein said pulling member is a wire (29), an intermediate portion thereof being retained around a pulley 28 on the arm (23), two portions of the wire (29) extending substantially parallel with each other, and both ends thereof being connected to the both sides of the second parallel link unit (14); each of said two front and rear guide wheel means being formed with a pair of pulleys 31, 31 and 32, 32, each set of the front and rear pulleys 31, 32 supporting one portion of the wire (29).

3. A balancer (8) as claimed in claim 1, wherein said spring (48) is a compressible coil spring (48) compressed between a socket (46) and a spring seat (47), said socket (46) being rotatably supported by the first bracket (11) by means of a pin (49) disposed parallel to said horizontal shaft for supporting the arm (23), said spring seat (47) being fixed to one end of a rod (45), the other end of which is pivotably supported by the shiftable nut (43), and an intermediate portion of which passes through an aperture of the socket (46).

* * * * *